US010685107B2

(12) United States Patent
Norvill et al.

(10) Patent No.: US 10,685,107 B2
(45) Date of Patent: Jun. 16, 2020

(54) DETECTION OF MALICIOUS INTENT IN PRIVILEGED IDENTITY ENVIRONMENTS

(71) Applicant: International Business Machines Corporation, Armonk, NY (US)

(72) Inventors: Trevor S. Norvill, Parkwood (AU); Codur S. Pranam, London (GB); Rohit U. Satyanarayana, Singapore (SG); Suhas Venkatesh Kashyap, Pasir Ris Grove (SG)

(73) Assignee: International Business Machines Corporation, Armonk, NY (US)

(*) Notice: Subject to any disclaimer, the term of this patent is extended or adjusted under 35 U.S.C. 154(b) by 280 days.

(21) Appl. No.: 15/791,509

(22) Filed: Oct. 24, 2017

(65) Prior Publication Data
US 2019/0121972 A1    Apr. 25, 2019

(51) Int. Cl.
*G06F 21/55*  (2013.01)
*H04L 29/06*  (2006.01)
(Continued)

(52) U.S. Cl.
CPC .......... *G06F 21/554* (2013.01); *G06F 21/316* (2013.01); *G06F 21/56* (2013.01);
(Continued)

(58) Field of Classification Search
CPC ...... G06F 21/554; G06F 21/316; G06F 21/56; H04L 63/1425; H04L 63/1441; H04L 63/1433; H04L 63/20
See application file for complete search history.

(56) References Cited

U.S. PATENT DOCUMENTS 8,793,790 B2   7/2014   Khurana
9,639,678 B2 * 5/2017   Moore ................. G06F 21/316
(Continued)

FOREIGN PATENT DOCUMENTS

EP    2863609 A1   4/2015
EP    2866411 A1   4/2015

OTHER PUBLICATIONS

Cyberark, "CyberArk Privileged Threat Analytics", Solution Brief, © 2000-2013 by Cyber-Ark Software Ltd. | cyberark.com, 9 pages.
(Continued)

*Primary Examiner* — Baotran N To
(74) *Attorney, Agent, or Firm* — Aaron N. Pontikos

(57) ABSTRACT

A computer-implemented method includes receiving a request to authenticate a user to remotely access a secure device and establishing, in response to the user being granted remote access to the secure device, a remote user session for the user. The computer-implemented method further includes identifying a plurality of actions performed during the remote user session. The computer-implemented method further includes comparing a first combination of actions in the plurality of actions to a plurality of policies for malicious intent. The computer-implemented method further includes determining a level of risk for malicious intent for the first combination of actions. The computer-implemented method further includes generating, in response to the level of risk of the first combination of actions exceeding a given threshold level, one or more preventive actions. A corresponding computer system and computer program product are also disclosed.

20 Claims, 3 Drawing Sheets

(51) Int. Cl.
*G06F 21/31* (2013.01)
*G06F 21/56* (2013.01)

(52) U.S. Cl.
CPC ...... *H04L 63/1425* (2013.01); *H04L 63/1441* (2013.01); *H04L 63/1433* (2013.01); *H04L 63/20* (2013.01)

(56) References Cited

U.S. PATENT DOCUMENTS

| | | | |
|---|---|---|---|
| 2005/0203881 A1* | 9/2005 | Sakamoto | G06F 21/552 |
| 2010/0269175 A1* | 10/2010 | Stolfo | G06F 21/55 726/22 |
| 2013/0268997 A1 | 10/2013 | Clancy, III | |
| 2014/0331280 A1 | 11/2014 | Porras | |
| 2015/0121461 A1* | 4/2015 | Dulkin | H04L 63/1408 726/4 |
| 2015/0121518 A1 | 4/2015 | Shmueli | |
| 2015/0200821 A1 | 7/2015 | Sade | |
| 2017/0286671 A1* | 10/2017 | Chari | G06F 21/552 |
| 2019/0095310 A1* | 3/2019 | Liran | G06F 11/3438 |

OTHER PUBLICATIONS

Filkins, Barbara, "The Expanding Role of Data Analytics in Threat Detection", SANS Institute, InfoSec Reading Room, Oct. 2015, © 2015 SANS Institute, 18 pages.

McDonald, Jim, "Privileged Account Management Primer", identropy, Jun. 25, 2012, 5 pages, <http://www.identropy.com/blog/IAM-blog/bid/85344/Privileged-Account-Management-Primer>.

Villegas, Mike, "How to limit privileged accounts and boost security", SearchSecurity, Mike Villegas—Jan. 26, 2016 9:31 AM, retrieved on Aug. 16, 2017 2:57 PM, 11 pages, <http://searchsecurity.techtarget.com/tip/How-to-limit-privileged-accounts-and-boost-security>.

* cited by examiner

DETECTION OF MALICIOUS INTENT IN PRIVILEGED IDENTITY ENVIRONMENTS

BACKGROUND

The present invention relates generally to the field of computer security, and more particularly to identity management.

Computer security (i.e., cyber security or IT security) is the protection of computer systems from the theft or damage to their hardware, software or information, as well as from disruption or misdirection of the services they provide. Computer security includes network security, which involves monitoring and preventing unauthorized access, misuse, modification or denial of computer networks and network-accessible resources. Accordingly, network security involves the authorization of individuals to access data in a network, which is controlled by a network administrator.

Identity management (i.e., identity and access management (IAM)) is the task of controlling information about users on computer systems. Such information includes information that authenticates the identity of a user, as well as information that describes the types of information and actions that the user is authorized to access and/or perform. Identity management further includes the management of descriptive information about the user, as well as how and by whom information about the user can be accessed and modified.

SUMMARY

A computer-implemented method includes receiving a request to authenticate a user to remotely access a secure device and establishing, in response to the user being granted remote access to the secure device, a remote user session for the user. The computer-implemented method further includes identifying a plurality of actions performed during the remote user session. The computer-implemented method further includes comparing a first combination of actions in the plurality of actions to a plurality of policies for malicious intent. The computer-implemented method further includes determining a level of risk for malicious intent for the first combination of actions. The computer-implemented method further includes generating, in response to the level of risk of the first combination of actions exceeding a given threshold level, one or more preventive actions. A corresponding computer system and computer program product are also disclosed.

DETAILED DESCRIPTION

Figure 1:
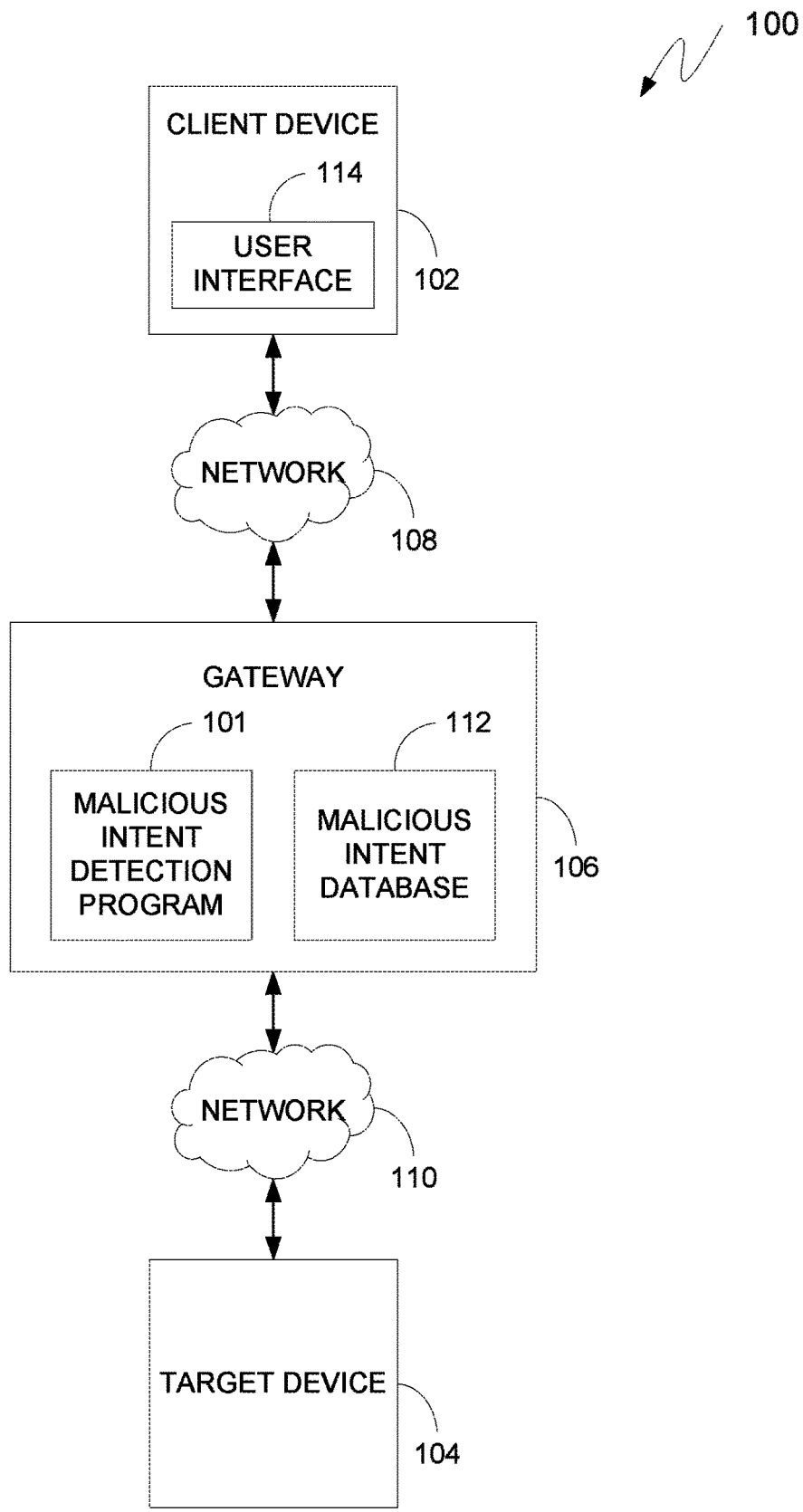
FIG. 1 is a functional block diagram of a network computing environment suitable for operation of a malicious intent detection program in accordance with at least one embodiment of the invention.

Privileged identity management (PIM) is a domain within identity management that focuses on monitoring and protecting superuser accounts in an organization's information technology (IT) systems, such as enterprise systems. A superuser account is a special user account with privilege levels far beyond those of most user accounts. Generally, a superuser account is used for system administration. Depending on the operating system, the actual name of this account may be root, administrator, admin, or supervisor. In some cases, the actual name of the account is not the determining factor. For example, in Unix-like operating systems, a user with a user identifier (UID) of zero is designated as the superuser, regardless of the name associated with the account. In another example, in systems that use a role based security model, any user with the role of superuser (or any of its synonyms) can carry out all actions associated with the superuser account. Superuser accounts are accounts that can only be accessed by privileged users. A privileged user is an individual who has administrative access to critical systems. Access to critical systems can include the ability to change system configurations, install software, change user accounts, and access secure data. For example, an individual who can set up and delete email accounts on a mail server may be a privileged user.

PIM software is crucial for a company or organization to ensure that compliance regulations are met with respect to protected information, as well as to prevent accidental or deliberate misuse of superuser accounts. PIM software can, among many tasks, manage the authentication and authorization of identities of privileged users, manage passwords with scheduled changes, and manage access controls. Furthermore, PIM software allows for auditing and compliance reporting of each user's access to and actions performed via a superuser account.

However, embodiments of the present invention recognize that although superuser accounts can only be accessed by privileged users, there remains the potential risk for a privileged user to make unrestricted, and potentially adverse, system-wide changes. These unrestricted, and potentially adverse, system-wide changes can be either intentional or unintentional. Moreover, embodiments of the present invention recognize that superuser accounts can be exploited by third-party malicious entities in order to perform a privilege escalation attack. A privilege escalation attack is a type of network intrusion that exploits a bug, design flaw, or configuration oversight in an operating system or software application to gain elevated access to elevated privileges they are not entitled to. These privileges can be used to perform malicious, unauthorized actions, such as deleting files, viewing private information, or installing unwanted programs such as viruses.

Embodiments of the present invention provide an adaptable, policy driven mechanism for the identification and protection of unauthorized, malicious intent performed via superuser accounts. Embodiments of the present invention allow an administrator to define what actions constitute malicious intent, irrespective of a particular user. Embodiments of the present invention provide for real-time detection and prevention of misuse of privileged accounts, thereby reducing the impact of malicious intent and data leakage. Embodiments of the present invention identify and correlate events performed by a privileged user on a client device and target device, as well as events conducted through a gateway used to connect a client device with a target device in order to determine the presence of malicious activity by a privileged user. Embodiments of the present invention identify and correlate events performed on a client device and target device, as well as events conducted through a gateway used to connect a client device with a target device in order to determine the presence of privilege escalation of a superuser account due to malware. Embodiments of the present invention provide for determining a level of risk of malicious activity based on correlating events performed on a client device and target system, as well as events conducted through a gateway used to connect a client device with a target device. Embodiments of the present invention provide for protective actions based on the type of malicious activity, as well as the level of risk associated with the type of malicious activity detected.

Some embodiments of the present invention may include one, or more, of the following features, characteristics, and/or advantages: (i) correlating events on privileged identity management gateways, administrative target devices, and user endpoint systems to produce malicious intent context information to be used in conjunction with a security policy; (ii) policy based mechanisms triggered by context information to prevent unauthorized data loss, access misuse, and other malicious actions; (iii) policy based mechanisms that allow system administrators to define and identify malicious intentions of a privileged user; (iv) detecting and preventing privilege escalation attacks across multiple access technologies and computer systems, including, but not limited to privileged identity management gateways, administrative target devices, and user endpoint systems; (v) reducing the impact of malicious actions through real-time detection and prevention of the misuse of privileged access to critical systems; and (vi) ability to identify privileged account misuse by humans (i.e., privileged users), as well as malicious software (i.e., malware).

Referring now to various embodiments of the invention in more detail, FIG. 1 is a functional block diagram of a network computing environment, generally designated 100, suitable for operation of a malicious intent detection (MID) program 101 in accordance with at least one embodiment of the invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Network computing environment 100 includes client device 102, target device 104, and gateway 106 interconnected over network 108 and network 110. Network 108 and network 110 can be, for example, a telecommunications network, a local area network (LAN), a wide area network (WAN), such as the Internet, or a combination of the three, and can include wired, wireless, or fiber optic connections. Network 108 and network 110 may include one or more wired and/or wireless networks that are capable of receiving and transmitting data, voice, and/or video signals, including multimedia signals that include voice, data, and video information. In general, network 108 and network 110 may be any combination of connections and protocols that will support communications between client device 102, target device 104, gateway 106, and other computing devices (not shown) within network computing environment 100.

In various embodiments of the invention, each of client device 102, target device 104, and gateway 106 is a computing device that can be a standalone device, a management server, a web server, a mobile device, or any other electronic device or computing system capable of receiving, sending, and processing data. In other embodiments, client device 102, target device 104, and gateway 106 represent a server computing system utilizing multiple computers as a server system, such as in a cloud computing environment. In an embodiment, client device 102, target device 104, and gateway 106 represent a computing system utilizing clustered computers and components (e.g. database server computers, application server computers, etc.) that act as a single pool of seamless resources when accessed within network computing environment 100. In general, gateway 106 represents any programmable electronic device or combination of programmable electronic devices capable of executing machine readable program instructions and communicating with client device 102, and target system 104 within network computing environment 100 via a network, such as network 108 and network 110. Gateway 106 includes MID program 101 and malicious intent database 112 communicatively coupled to gateway 106. Although MID program 101 and malicious intent database 112 is depicted in FIG. 1 as being integrated with gateway 106, in alternative embodiments, MID program 101 and malicious intent database 112 is remotely located from gateway 106. Client device 102, target device 104, and gateway 106 may include internal and external hardware components, as depicted and described in further detail with respect to FIG. 3.

Client device 102 allows a privileged user to access target device 104 through gateway 106. Generally, client device 102 is used by a privileged user to perform administrative tasks, including, but not limited to: (i) introducing and integrating new technologies into existing data center environments; (ii) performing routine audits of systems and software; (iii) applying operating system updates, patches, and configuration changes; (iv) installing and configuring new hardware and software; (v) adding, removing, or updating user account information, and resetting passwords; and (vi) accessing secure data. The previously listed administrative tasks may be performed either directly on client device 102, target device 104, or on other computing devices (not shown) via target device 104.

In some embodiments, client device 102 accesses target device 104 via a client-based application that runs on client device 102. In some embodiments, client device 102 accesses target device 104 via a web-based application that runs on a web browser. In any of these embodiments, client device 102 accesses target device 104 via any generally known network protocols used to communicate with and execute commands on target device 104 via a network, such as network 108. For example, if target device 104 is a Unix based server, client device 102 may remotely access target device 104 via a client-based application that uses the Secure Shell (SSH) protocol. In another example, if target device 104 is a Microsoft® Windows based device, such as a Windows desktop computer, client device 102 may remotely access target device 104 via a client-based application that uses the Remote Desktop Protocol (RDH). In yet another example, if target device 104 is a Linux based server, client device 102 may remotely communicate with target device 104 via a web-based application, such as Google Chrome™ SSH web extension.

Client device 102 includes user interface 114. User interface 114 provides an interface between client device 102, target device 104, and gateway 106. In some embodiments, user interface 114 may be a graphical user interface (GUI) or a web user interface (WUI) and can display text, documents, web browser windows, user options, application interfaces, and instructions for operation, and includes the information (such a graphic, text, and sound) that a program presents to a user and the control sequences the user employs to control the program. In another embodiment, user interface 114 may also be mobile application software that provides an interface between client device 102, target device 104, and gateway 106. Mobile application software, or an "app", is a computer program that runs on smartphones, tablet computers, smartwatches and other mobile devices.

Target device 104 is any programmable electronic device or computing system that is remotely accessible by client device 102. In some embodiments, target device 104 may be any generally known type of server, including, but not limited to a web-server, database server, remote desktop server, and a mail server that client device 102 accesses to perform privileged actions on target device 104 in accordance with a level of authorization associated with a particular user. In these embodiments, target device 104 may be accessed by a privileged user in order to perform actions on another remote device (not shown) or retrieve data from a database (not shown). In some embodiments, target device 104 is a client device, such as client device 102. For example, in these embodiments, target device 104 may be a laptop computer, tablet computer, netbook computer, personal computer (PC), a desktop computer, a personal digital assistant (PDA), a smart phone, or any programmable electronic device capable of receiving, sending, and processing data.

Gateway 106 processes and manages security protocols for access to target device 104 by a user of client device 102. Generally, gateway 106 may be any programmable electronic device or combination of programmable electronic devices that act as a gateway between two networks. For example, gateway 106 may be a router, firewall, server, or any other device or combination thereof that enables the transfer of data to and from target device 104. In embodiments of the invention, gateway 106 translates data received and transmitted between client device 102 and target device 104 into a format or protocol recognized by client device 102 and target device 104. In embodiments of the invention, gateway 106 includes relevant user authentication and authorization data for a privileged user of client device 102 in order to enforce user authentication and authorization processes when access to target device 104 is requested. In these embodiments, each of client device 102, target device 104, and gateway 106 may be a secure device.

Gateway 106 includes MID program 101 and malicious intent database 112. MID program 101 identifies active applications, elements within the applications, and user interactions within these applications performed on client device 102 and target device 104, as well as actions conducted through gateway 106. In embodiments of the invention, MID program 101 correlates a plurality of interactions (both privileged and non-privileged) with client device 102, target device 104, and gateway 106 in order to determine whether a user is engaging or has engaged in malicious activity. In embodiments of the invention, MID program 101 identifies malicious activity associated with a plurality of interactions with client device 102, target device 104, and gateway server 106 during one or more remote user sessions. In these embodiments, MID program 101 identifies malicious activity based on matching combinations of actions with one or more policies for malicious intent. MID program 101 further performs protective actions based on the type of malicious activity, as well as the level of risk associated with the malicious activity.

Malicious intent database 112 includes a plurality of adaptable security policies that define the type of actions and combinations of actions that an administrator considers to be at risk for malicious intent, as well as under which circumstances particular combinations of actions form malicious activity. More specifically, malicious intent database 112 includes a categorical framework for identifying malicious intent based on actions performed alone, or in combination with client device 102, target device 104, and gateway 106 during one or more privileged user sessions. Typically, a privileged user is granted a privileged user session based on authentication of login credentials associated with the privileged user. The particular actions that a privileged user may perform is dependent on the level of authorization associated with an individual's login credentials. Accordingly, based on the level of authorization associated with the login credentials, the user may be restricted from performing actions beyond those designated by their level of authorization. However, the actions that privileged users (i.e., users who have attained a designation of "privileged user" or "super user") can perform on a remote system, such as target system 104, may ultimately be unlimited.

Embodiments of the invention recognize that since a privileged user may be authorized to perform any number of actions, these actions, when taken individually, are not regarded as malicious. It should be appreciated that the plurality of policies enables MID program 101 to identify malicious activity based on various combinations of actions, of which the combinations of actions, when performed individually, are otherwise authorized for a given user. Embodiments of the present invention recognize that what is considered to be malicious intent is dynamic, such that actions performed by privileged users of a superuser account can change based on administrative preferences, as well as the contexts surrounding the use of superuser accounts. Accordingly, the plurality of policies for malicious intent can be modified in order to best define what combinations of authorized user actions a system administrator regards as malicious activity.

Figure 2:
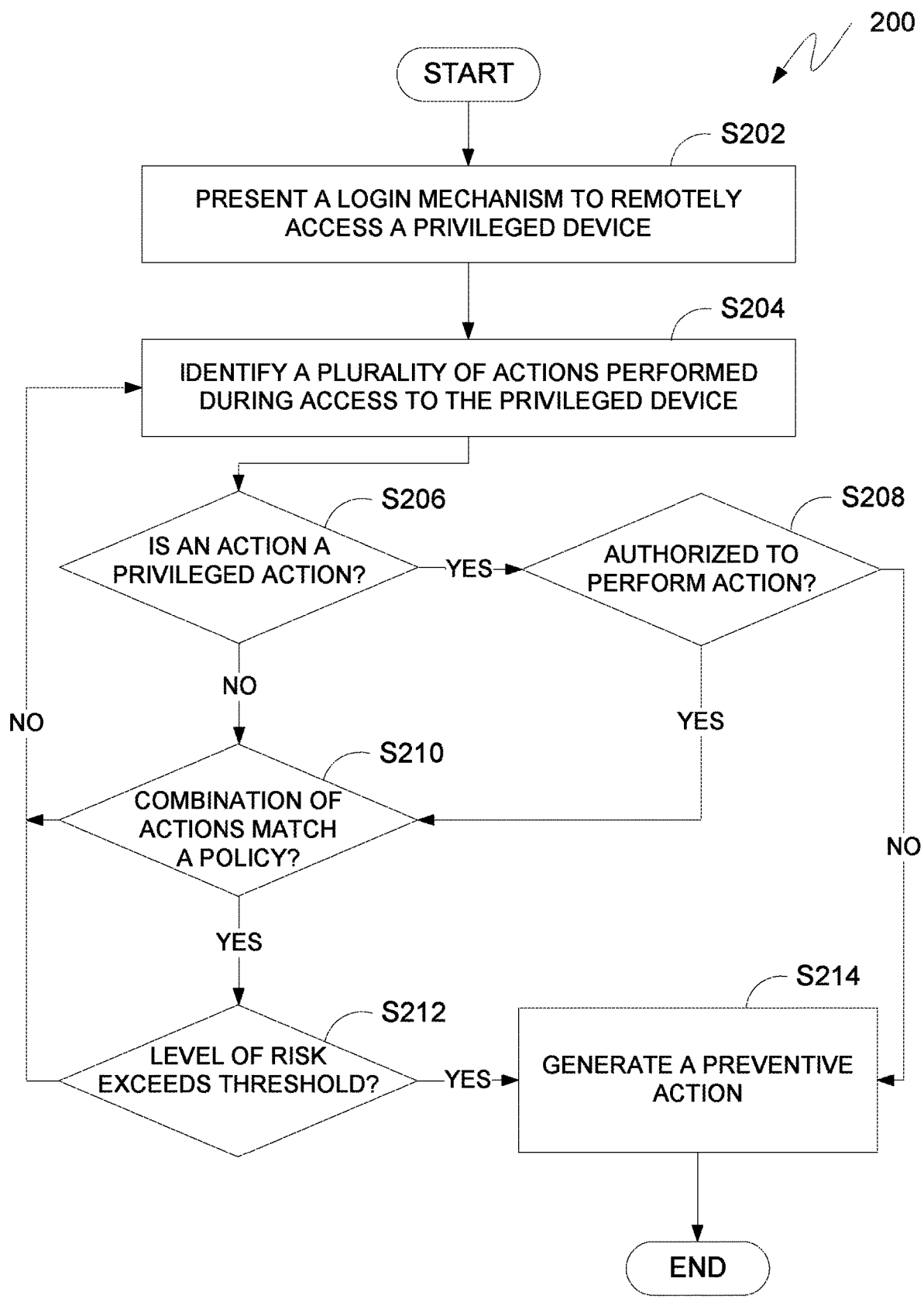
FIG. 2 is a flow chart diagram depicting operational steps for a malicious intent detection program in accordance with at least one embodiment of the invention.

FIG. 2 is a flow chart diagram depicting operational steps for MID program 101 in accordance with at least one embodiment of the invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, MID program 101 presents a user of client device 102 with a login mechanism to remotely access a secure device. In embodiments of the invention, a login mechanism provides a user of client device 102 the ability to access target device 104 (via gateway 106) upon successful authentication of login credentials associated with a privileged user account. In some embodiments, MIPD program 101 presents a login mechanism in response to a user of client device 102 opening a client-based application to access target system 104 via gateway 106. In some embodiments, MID program presents a login mechanism in response to a user of client device 102 opening a web-based application to access target system 104 via gateway 106. Here, a user may automatically be directed to a login mechanism upon opening a web browser or subsequently directed to a login mechanism in response to selection of a hyperlink. Depending on the privilege level associated with a user, MID program 101 may alter the type of authentication protocol and/or authentication method associated with a login mechanism. Upon authentication of a request to remotely access a secure device, MID program 101 establishes a remote user session for the user.

At step S204, MID program 101 identifies a plurality of actions performed during access to a secure device. In embodiments of the invention, MID program 101 identifies a plurality of actions performed on each of client device 102, target device 104, and gateway 106. In some embodiments, MID program 101 identifies actions performed on client device 102 and target device 104 during one or more remote user sessions. In some embodiments, MID program 101 identifies actions performed on client device 102 prior to and/or after a connection to gateway 106 is terminated. In some embodiments, MID program 101 identifies actions performed on client device 102 prior to and/or after a user session is terminated.

In embodiments of the invention, MID program 101 identifies actions through the use of user activity monitoring software. User activity monitoring may generally be understood as a record of information related to user actions while communicating with or otherwise interacting with a computer system (e.g., a server, virtual machine, or desktop computer), software component (e.g., an application or middleware), database, or external hardware. More specifically, user monitoring is the monitoring and recording of user actions, including, but not limited to the use of applications, opening of windows, execution of system commands and scripts, cursor movements, mouse clicks, keystrokes, text entered or edited, URL's visited, files accessed and/or downloaded, and the transfer of data to and from external devices.

In these embodiments, user activity monitoring software may be implemented on at least one of client device 102, target device 104, and gateway 106, such that various user action information is automatically transmitted in real-time to MID program 101 via network 108 and network 110. In some embodiments, user activity monitoring software may be implemented on client device 102 and target device 104 as mobile application software. In some embodiments, MID program 101 receives user action information recorded as text data. For example, MID program 101 receives log files that include user action information from one or more log agents installed on at least one of client device 102, target device 104, and gateway 106. In another example, MID program 101 receives log files that include device-related user actions, such as downloading or uploading files from external devices (e.g., a flash drive or external hard drive) connected to at least one of client device 102, target device, and gateway 106. Here, a list of files transferred to or from an external device is recorded upon detection of the external device. In some embodiments, MID program 101 receives user action information recorded as image or video data. For example, MID program 101 receives screen-captures (i.e., "screen-shots") or video recordings of the screen display of client device 102 or target device 104 captured via session recording software installed on at least one of client device 102, target device, and gateway 106.

At decision step S206, MID program 101 determines whether each action in the plurality of actions is a privileged action. If an action is determined to be a privileged action, MID program 101 proceeds to decision step S208 (decision step "YES" branch). If an action is not determined to be a privileged action (i.e., "non-privileged action"), MID program 101 proceeds to step S210 (decision step "NO" branch).

A privileged action may generally be understood as any action that requires authorization. Privileged actions are typically associated with accounts with elevated levels of authorization, such as administrative accounts, in which a user is authorized to make changes to system settings or manage other user accounts. Examples of privileged actions include, but are not limited to creating a file in a directory, reading, writing to, or deleting a file on a device, access to a secure device, executing commands or scripts on a secure device, and creating, modifying, or deleting user account information, such as passwords or personal information.

A non-privileged action may generally be understood as any action that does not require authentication and authorization. A non-privileged action is inherently authorized, such that the action may be performed regardless of the particular user. Non-privileged actions are typically associated with standard user accounts, in which a user can perform basic or generic computer functions. Examples of non-privileged actions include, but are not limited to opening a web-browser, accessing file sharing tools, the use of screen capture tools, opening an email client, attaching files to email, and transmitting files to and from external storage devices. It should be noted, however, that any of the previously listed actions may ultimately be regarded as both privileged and non-privileged actions, depending on whether authorization is required to perform an action. For example, reading, writing to, or deleting a file stored on a desktop computer, such as client device 102, is a non-privileged action. However, if authorization is required to access a private company server, such as target device 104, via client device 102, then reading, writing to, or deleting a file becomes a privileged action.

At decision step S208, MID program 101 determines whether a user is authorized to perform a privileged action. If a user is authorized to perform a privileged action, MID program 101 proceeds to step S210 (decision step "YES" branch). If a user is not authorized to perform a privileged action, MID program 101 proceeds to step S214.

The actions that a user may perform is based, at least in part, on the privileges associated with a user's account. Accordingly, based on the level of authorization associated with each user account, MID program 101 restricts users from performing actions that are beyond those privileges associated with their level of authorization. For example, John and Steve each enter login credentials to access the same remote Unix based server, such as target device 104, via SSH client. If the login credentials are authenticated, John and Steve may perform actions in accordance with those privileges associated with each of their accounts. In this example, John is authorized to compile programs using GNU Complier Collection (GCC) compilers on target system 104, but is not authorized to upload files to or download files from target system 104. On the other hand, Steve is authorized to upload files to or download files from target system 104, but is not authorized to modify files (e.g., delete files) on target system 104.

In some embodiments, MID program 101 determines whether a user is authorized to perform a privileged action based on accessing a role-based access control (RBAC) model. In some embodiments, MID program 101 determines whether a user is authorized to perform an action based on accessing an attribute-based access control (ABAC) model. In other embodiments, MID program 101 determines whether a user is authorized to perform an action based on accessing both an RBAC model and an ABAC model in a hierarchical approach. For example, an RBAC model is used to designate who can see particular file directories or lists, and an ABAC model is used to designate what information within a file a user can see, or what actions a user can perform with respect to a file.

At decision step S210, MID program 101 determines whether a combination of actions in the plurality of actions match one or more policies for malicious intent. Here, MID program 101 compares combinations of actions in the plurality of actions to the plurality of policies for malicious intent. In some embodiments, at least one action in each combination of actions is authorized during the remote user session. In other embodiments, each action in each combination of actions is authorized during the remote session. In other words, each action in a combination of actions, taken individually, is authorized during the remote user session. In an embodiment, a combination of actions is at least one action. In an embodiment, a combination of actions is two or more actions. If a combination of one or more of the plurality of actions match one or more policies for malicious intent, MID program 101 proceeds to decision step S212 (decision step "YES" branch). If a combination of at least a portion of the plurality of actions do not match one or more policies for malicious intent, MID program 101 returns to step S204 (decision step "NO" branch).

Each policy in the plurality of policies includes combinations of actions that indicate the presence of malicious intent. For example, malicious intent policy 110 includes a policy to detect malicious intent after a user performs a screen capture of privileged information stored on a remote device via remote desktop access. Here, the policy states that any of the following combinations of actions following a remote desktop access to a remote device and a screen capture of privileged information stored on a remote device indicate malicious intent: (i) opening of a mail client and attaching the screen shot in an email; (ii) saving the screen shot and detection of an external storage device; and (iii) saving the screen shot and identification of access to a file sharing tool.

In embodiments of the invention, whether a combination of a portion of the plurality of actions match one or more policies for malicious intent is based, at least in part, on the device on which each action is performed, the access method used to perform each action on the device, and whether authorization is required to perform an action or access a device. For example, accessing client device 102, downloading a file onto client device 102, and opening an email client on client device 102 does not match one or more policies for malicious intent. However, remotely accessing target device 104 from client device 102, downloading a file onto target device 104, and opening an email client on target device 104 does match one or more policies for malicious intent. Here, although the same actions are performed in both scenarios, the determination of malicious intent in the second scenario is a result of a remote access to target device 104 via gateway 106, and performance of the actions on target device 104.

In some embodiments, MID program 101 determines malicious intent based, at least in part, on matching a combination of privileged actions to one or more policies for malicious intent. In some embodiments, MID program 101 determines malicious intent based, at least in part, on matching a combination of non-privileged actions to one or more policies for malicious intent. In some embodiments, MID program 101 determines malicious intent based, at least in part, on matching a combination of privileged actions and non-privileged actions to one or more policies for malicious intent. For example, an administrative user remotely logs onto target device 104, such as a Windows™ domain controller (DC), via gateway 106, to access an active directory service. An active directory service allows for management and storage of privileged information about members of a domain, including, but not limited to authentication and authorization information for access to a domain, permissions granted for a domain, as well as which domain resources may be accessed, such as shared folders, printers, and applications. In this example, MID program 101 identifies several privileged actions performed on target device 104 via client device 102, including deleting users, adding users, and changing permissions for users within the active directory. MID program 101 further identifies, among several non-privileged actions, a screen capture of information contained in a file of the active directory. Here, MID program 101 determines that a combination of remotely accessing the Windows™ DC (privileged action), accessing the active directory (privileged action) and performing a screen capture (non-privileged action) of information contained in a file of the active directory match one or more policies for malicious intent.

In alternative embodiments, the plurality of policies for malicious intent include one or more policies to detect malware. Malware (i.e., malicious software) is defined by its malicious intent and is designed to gain access to and/or cause harm to computers without a user's consent. Malware includes a variety of hostile or intrusive software, such as computer viruses, worms, Trojan horses, ransomware, spyware, and adware. In these embodiments, at Step S212, MID program 101 determines whether a combination of at least a portion of the plurality of actions match one or more policies for malware. For example, MID program 101 identifies that a connection (e.g., via SSH) has been made between client device 102 and server 106 to access target device 104. Typically, a connection between client device 102 and server 106 to access target 104 can only be made via a web-based client. However, no indication is received that a web browser is open on client device 102. MID program 101 further identifies privileged commands running on target device 104. In this example, MID program 101 determines that a combination of a browserless access to target system 104 through gateway 106 (privileged action) and performing privileged actions on target system 104 match one or more policies for malware.

At decision step S212, MID program 101 determines whether a level or risk for malicious intent for a combination of actions is above a given threshold level. In embodiments of the invention, a combination of actions is malicious if the level of risk for malicious intent is above a given threshold level. If the level of risk for malicious intent is above the given threshold level, MID program 101 proceeds to step 214 (decision step "YES" branch). If the level of risk for malicious intent is below the given threshold level, MID program 101 returns to step S204 (decision step "NO" branch).

In some embodiments, the level of risk for malicious intent for a combination of actions is based, at least in part, on a predetermined level of risk associated with a policy. Here, MID program 101 determines a level of risk based, at least in part, on a level of risk associated with a policy that matches a combination of actions. For example, MID program 101 determines that a combination of opening a web browser on client device 102 and running non-privileged commands on a Linux server, such as target device 104, via gateway 106, matches a first policy for a low risk of malicious intent. However, MID program 101 determines that a combination of opening a web browser on client device 102 and running privileged commands on target device 104, via gateway 106, matches a second policy for a high risk of malicious intent.

In some embodiments, the level of risk for malicious intent for a combination of actions is based, at least in part, on analyzing historical session data corresponding to a user account. In an embodiment, MID program 101 increases a level of risk for malicious intent associated with a policy if the combination of actions of a user deviate from historical session data. For example, MID program 101 increases the level of risk for malicious intent based on a deviation of actions typically performed by a particular user or job role. In an embodiment, MID program 101 decreases the level of risk for malicious intent if the combination of actions conforms with historical session data.

In alternative embodiments, if a level of risk for malicious intent is below the given threshold level, MID program 101 monitors actions in the plurality of actions for one or more additional actions, that when combined with a combination of actions, results in a change in the level of risk for malicious intent. For example, MID program 101 determines that a combination of downloading a privileged file from target device 104 onto client device 102 and opening a mail client on client device 102 matches one or more policies for a low risk for malicious intent. Subsequently, MID program 101 identifies that the privileged file downloaded from target device 104 has been attached to an email. Here, attaching the privileged file to an email on client device 102 is determined to increase the level of risk for malicious intent above the given threshold level.

At step S214, MID program 101 generates one or more preventive actions. In some embodiments, a preventive action is generated in response to determining that a user is not authorized to perform a privileged action. In other embodiments, a preventive action is generated in response to a level of risk for malicious intent for a combination of actions exceeding a given threshold level. In these embodiments, a preventive action may generally be understood as a method of reducing or eliminating malicious activity based on the identification of malicious intent. In other words, a preventive action prevents a user and/or malware from executing a malicious action. Examples of preventive actions include, but are not limited to issuing a warning message, access denial message, or, terminating a connection to a gateway, terminating a connection to a target device, terminating a remote user session, preventing a transmission of an email, preventing a transfer of data to an external storage device, and suspending or terminating privileges. In embodiments of the invention, each policy for malicious intent includes one or more preventive actions. In these embodiments, MID program 101 performs preventive actions on client device 102, target device 104, and gateway 106 either individually or in combination with one another. It should be appreciated that the type of preventive action generated for each policy is dynamic, such that the type of preventive action can change based on administrative preferences.

In alternative embodiments, MID program 101 modifies a preventive action based on identifying a pattern of malicious intent. For example, MID program 101 determines that a combination of actions performed during a first remote user session on client device 102 match a first policy for malicious intent. In accordance with the first policy, MID program 101 issues a notification to a user that the combination of actions performed is not permissible. The notification may further list the combination of actions that constitute malicious intent. In this example, MID program 101 determines that the same combination of actions performed during the first remote user session have once again been performed during a second remote user session. Accordingly, instead of issuing a notification, MID program 101 terminates the remote user session on client device 102.

Figure 3:
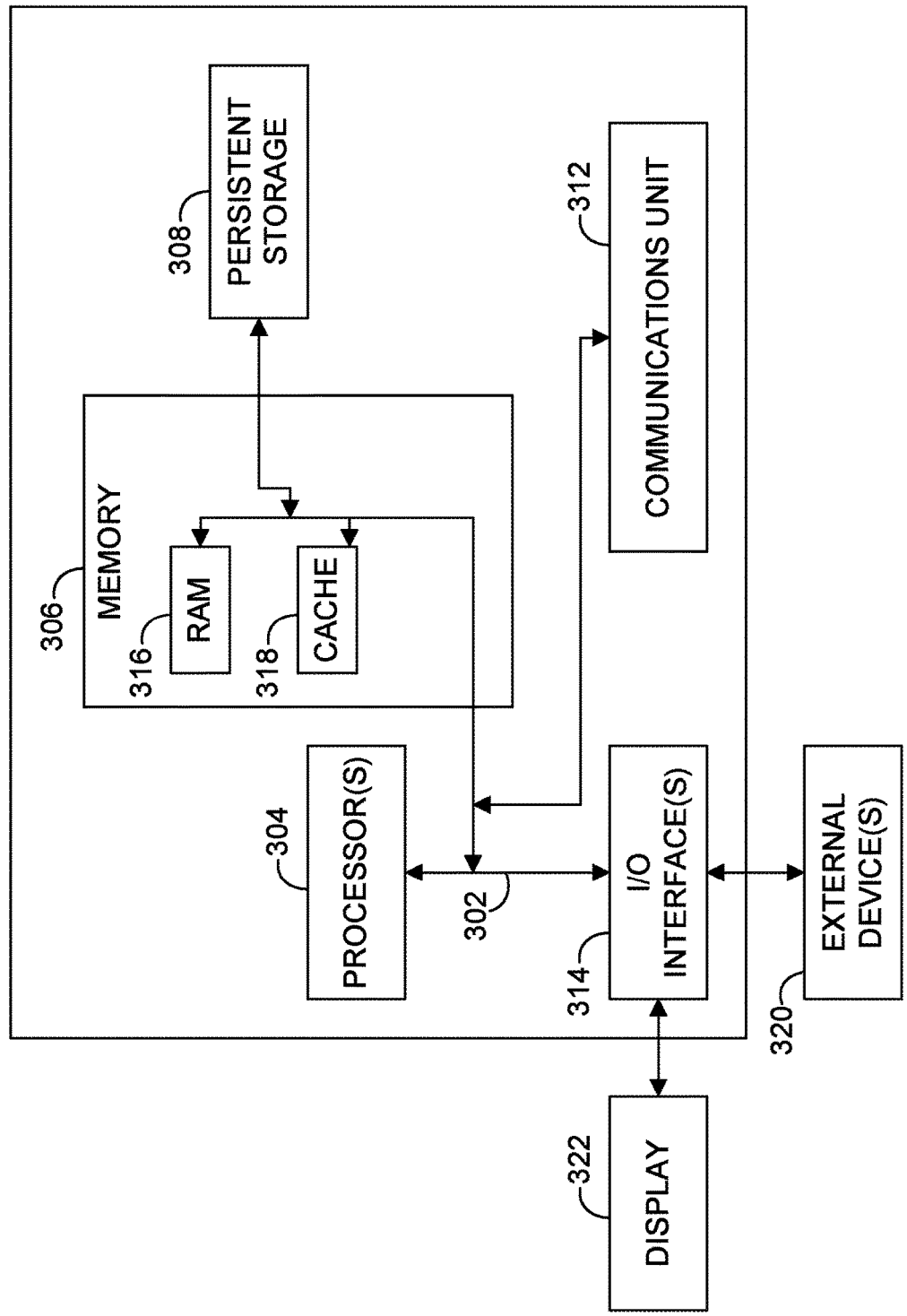
FIG. 3 is a block diagram depicting components of a computer 300 suitable for executing MID program 101 in accordance with at least one embodiment of the invention.

FIG. 3 is a block diagram depicting components of a computer 300 suitable for executing MID program 101 in accordance with at least one embodiment of the invention. In an embodiment, computer 300 is representative of client device 102, target device 104, and gateway server 106. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with any architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random access memory (RAM) 316 and a cache 318. In general, the memory 306 may comprise any suitable volatile or non-volatile one or more computer readable storage media.

Program instructions for MID program 101 may be stored in the persistent storage 308, or more generally, any computer readable storage media, for execution by one or more of the respective computer processors 304 via one or more memories of the memory 306. The persistent storage 308 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving a request to authenticate a user to remotely access a secure device;
    establishing, in response to the user being granted remote access to the secure device, a remote user session for the user;
    identifying a plurality of actions performed during the remote user session, wherein the plurality of actions includes at least one action performed on the secure device;
    comparing a first combination of actions in the plurality of actions to a plurality of policies for malicious intent, wherein:
        at least one action in the first combination of actions is authorized during the remote user session;
    determining a level of risk for the first combination of actions based, at least in part, on the comparison of the first combination of actions and the plurality of policies for malicious intent; and
    generating, in response to the level of risk of the first combination of actions exceeding a given threshold level, one or more preventive actions.

2. The computer-implemented method of claim 1, wherein generating the one or more preventive actions is based, at least in part, on:
    the first combination of actions; and
    the level of risk associated with the first combination of actions.

3. The computer-implemented method of claim 1, wherein determining the level of risk for malicious intent for the first combination of actions is further based, at least in part, on analyzing historical session data corresponding to the user.

4. The computer-implemented method of claim 3, further comprising:
    increasing the level of risk for malicious intent associated with the first combination of actions based, at least in part, on the first combination of actions deviating from the historical session data.

5. The computer-implemented method of claim 1, further comprising:
    comparing a second combination of actions in the plurality of actions to the plurality of policies for malicious intent, wherein:
        at least one action in the second combination of actions is authorized during the remote user session;
    determining a level of risk for malicious intent for the second combination of actions based, at least in part, on the comparison of the first combination of actions and the plurality of policies for malicious intent; and
    monitoring, in response to the level of risk of the second combination of actions falling below the given threshold level, additional actions performed during the remote user session.

6. The computer-implemented method of claim 1, further comprising:
    identifying a pattern of performing the first combination of actions over a given period of time; and
    modifying the one or more preventive actions based on identifying the pattern.

7. The computer-implemented method of claim 1, wherein the plurality of policies for malicious intent include one or more policies to detect malware.

8. The computer-implemented method of claim 1, wherein the one or more preventive actions include terminating the remote user session.

9. A computer program product, the computer program product comprising one or more computer readable storage media and program instructions stored on the one or more computer readable storage media, the program instructions comprising instructions to:
    receive a request to authenticate a user to remotely access a secure device;
    establish, in response to the user being granted remote access to the secure device, a remote user session for the user;
    identify a plurality of actions performed during the remote user session, wherein the plurality of actions includes at least one action performed on the secure device;
    compare a first combination of actions in the plurality of actions to a plurality of policies for malicious intent, wherein:
        at least one action in the first combination of actions is authorized during the remote user session;
    determine a level of risk for malicious intent for the first combination of actions based, at least in part, on the comparison of the first combination of actions and the plurality of policies for malicious intent; and
    generate, in response to the level of risk of the first combination of actions exceeding a given threshold level, one or more preventive actions, wherein the one or more preventive actions include terminating the remote user session.

10. The computer program product of claim 9, wherein the program instructions to generate the one or more preventive actions is based, at least in part, on:
    the first combination of actions; and
    the level of risk associated with the first combination of actions.

11. The computer program product of claim 9, wherein the program instructions to determine the level of risk for malicious intent for the first combination of actions is further based, at least in part, on program instructions to analyze historical session data corresponding to the user.

12. The computer program product of claim 11, further comprising program instructions to:
    increase the level of risk for malicious intent associated with the first combination of actions based, at least in part, on the first combination of actions deviating from the historical session data.

13. The computer program product of claim 9, further comprising program instructions to:
    compare a second combination of actions in the plurality of actions to the plurality of policies for malicious intent, wherein:
        at least one action in the second combination of actions is authorized during the remote user session;
    determine a level of risk for malicious intent for the second combination of actions based, at least in part, on the comparison of the first combination of actions and the plurality of policies for malicious intent; and monitor, in response to the level of risk of the second combination of actions falling below the given threshold level, additional actions performed during the remote user session.

14. The computer program product of claim 9, further comprising program instructions to:
identify a pattern of performing the first combination of actions over a given period of time; and
modify the one or more preventive actions based on identifying the pattern.

15. The computer program product of claim 9, wherein the plurality of policies for malicious intent include one or more policies to detect malware.

16. A computer system comprising:
one or more computer processors;
one or more computer readable storage media;
computer program instructions;
the computer program instructions being stored on the one or more computer readable storage media for execution by the one or more computer processors; and
the computer program instructions comprising instructions to:
receive a request to authenticate a user to remotely access a secure device;
establish, in response to the user being granted remote access to the secure device, a remote user session for the user;
identify a plurality of actions performed during the remote user session, wherein the plurality of actions includes at least one action performed on the secure device;
compare a first combination of actions in the plurality of actions to a plurality of policies for malicious intent, wherein:
at least one action in the first combination of actions is authorized during the remote user session;
determine a level of risk for malicious intent for the first combination of actions based, at least in part, on the comparison of the first combination of actions and the plurality of policies for malicious intent; and
generate, in response to the level of risk of the first combination of actions exceeding a given threshold level, one or more preventive actions, wherein the one or more preventive actions include terminating the remote user session.

17. The computer system of claim 16, wherein the program instructions to generate the one or more preventive actions is based, at least in part, on:
the first combination of actions; and
the level of risk associated with the first combination of actions.

18. The computer system of claim 16, wherein the program instructions to determine the level of risk for malicious intent for the first combination of actions is further based, at least in part, on program instructions to analyze historical session data corresponding to the user.

19. The computer system of claim 18, further comprising program instructions to:
increase the level of risk for malicious intent associated with the first combination of actions based, at least in part, on the first combination of actions deviating from the historical session data.

20. The computer system of claim 16, further comprising program instructions to:
compare a second combination of actions in the plurality of actions to the plurality of policies for malicious intent, wherein:
at least one action in the second combination of actions is authorized during the remote user session;
determine a level of risk for malicious intent for the second combination of actions based, at least in part, on the comparison of the first combination of actions and the plurality of policies for malicious intent; and
monitor, in response to the level of risk of the second combination of actions falling below the given threshold level, additional actions performed during the remote user session.

\* \* \* \* \*